United States Patent
Wang et al.

(10) Patent No.: US 6,693,958 B1
(45) Date of Patent: Feb. 17, 2004

(54) ADAPTIVE CHANNEL EQUALIZER HAVING A TRAINING MODE

(75) Inventors: Tian Jun Wang, Indianapolis, IN (US); Dong-Chang Shiue, Carmel, IN (US); Adolf D'Souza, Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/218,186

(22) Filed: Dec. 22, 1998

(51) Int. Cl.[7] .............................. H04L 25/03; H04N 5/21
(52) U.S. Cl. ...................... 375/232; 375/231; 348/726
(58) Field of Search .................... 375/231, 232, 375/233, 234, 324, 325, 326, 346, 348, 350; 348/426.1, 427.1, 429.1, 432.1, 470, 474, 495, 725, 726

(56) References Cited

U.S. PATENT DOCUMENTS

| | | | | |
|---|---|---|---|---|
| 5,473,321 A | * | 12/1995 | Goodman et al. | 340/854.9 |
| 5,475,444 A | | 12/1995 | Kim | 348/608 |
| 5,572,547 A | | 11/1996 | Citta et al. | 375/232 |
| 5,592,235 A | * | 1/1997 | Park et al. | 348/555 |
| 5,619,269 A | * | 4/1997 | Lee et al. | 348/432 |
| 5,684,827 A | * | 11/1997 | Nielsen | 375/232 |
| 5,841,484 A | * | 11/1998 | Hulyalkar et al. | 348/607 |
| 5,878,086 A | * | 3/1999 | Hulyalkar | 375/285 |
| 5,886,748 A | * | 3/1999 | Lee | 348/614 |
| 5,955,618 A | * | 9/1999 | Kim | 348/471 |

FOREIGN PATENT DOCUMENTS

| | | | |
|---|---|---|---|
| GB | 2 309 140 A | 7/1997 | H04N/5/21 |
| JP | 8-1865223 A | 7/1996 | H04B/1/76 |

OTHER PUBLICATIONS

W. Bretl, et al., entitled VSB Modem Subsystem Design for Grand Alliance Digital Television Receivers, published Jun. 12, 1995, pp. 773–786, US.
Grand Alliance HDTV System Specification, Apr. 14, 1994, entire specification.

* cited by examiner

Primary Examiner—Young T. Tse
(74) Attorney, Agent, or Firm—Joseph S. Tripoli; Joseph J. Laks; Ronald H. Kurdyla

(57) ABSTRACT

An adaptive channel equalizer (50) for processing a demodulated VSB signal containing terrestrial broadcast high definition television information operates adaptively in blind, training, and decision-directed modes. The VSB signal is characterized by a data frame format (FIG. 2) constituted by a succession of data fields each containing a data segment prefaced by a field sync segment. Equalization is expedited by recycling (35) received training data through the equalizer more than once during a VSB data field after a field sync segment is detected.

10 Claims, 4 Drawing Sheets

ADAPTIVE CHANNEL EQUALIZER HAVING A TRAINING MODE

FIELD OF THE INVENTION

This invention concerns adaptive channel equalization of a signal which may contain high definition television information.

BACKGROUND OF THE INVENTION

The recovery of data from modulated signals conveying digital information in symbol form usually requires three functions at a receiver: timing recovery for symbol synchronization, carrier recovery (frequency demodulation to baseband), and channel equalization. Timing recovery is a process by which a receiver clock (timebase) is synchronized to a transmitter clock. This permits the received signal to be sampled at the optimum point in time to reduce the chance of a slicing error associated with decision-directed processing of received symbol values. Carrier recovery is a process by which a received RF signal, after being frequency down converted to a lower intermediate frequency passband (eg., near baseband), is frequency shifted to baseband to permit recovery of the modulating baseband information.

Many digital data communications systems employ adaptive equalization to compensate for the effects of changing channel conditions and disturbances on the signal transmission channel. The equalization process estimates the transfer function of the transmission channel and applies the inverse of the transfer function to the received signal so as to reduce or eliminate the distortion effects. Channel equalization typically employs filters that remove from a received signal amplitude and phase distortions resulting from a frequency dependent time variant response of the transmission channel, for example, to thereby provide improved symbol decision capability. Equalization removes baseband intersymbol interference (ISI) caused by transmission channel disturbances including the low pass filtering effect of the transmission channel. ISI causes the value of a given symbol to be distorted by the values of preceding and following symbols, and essentially represents symbol "ghosts" since ISI includes advanced and delayed symbols with respect to a reference symbol location in a given decision region.

An adaptive equalizer is essentially an adaptive digital filter. In systems using an adaptive equalizer, it is necessary to provide a method of adapting the filter response so as to adequately compensate for channel distortions. Several algorithms are available for adapting the filter coefficients and thereby the filter response. One widely used method employs the Least Mean Squares (LMS) algorithm. In this algorithm, by varying coefficient values as a function of a representative error signal, the equalizer output signal is forced to approximate a reference data sequence. This error signal is formed by subtracting the equalizer output signal from the reference data sequence. As the error signal approaches zero, the equalizer approaches convergence whereby the equalizer output signal and the reference data sequence are approximately equal.

When the equalizer operation is initiated, the coefficient values (filter tap weights) are usually not set at values which produce adequate compensation of channel distortions. In order to force initial convergence of the equalizer coefficients, a known "training" signal may be used as the reference signal. Training signals, eg., a pseudorandom number (PN) sequence, have been used extensively in telecommunications devices such as television receivers and telephone modems. A major benefit of employing a known PN sequence training signal in the transmission is that errors can be accurately obtained, and the equalizer can be trained to equalize the transmission channel before and during transmitting and receiving data.

The training signal is programmed at both the transmitter and receiver. The error signal is formed at the receiver by subtracting a locally generated receiver copy of the training signal from the output of the adaptive equalizer. The training signal helps to open the initially occluded "eye" characteristic of the received signal, as known. After adaption with the training signal, the "eye" has opened considerably and the equalizer is switched to a decision-directed operating mode. In this mode final convergence of the filter tap weights is achieved by using the actual values of symbols from the output of the equalizer instead of using the training signal. The decision directed equalizing mode is capable of tracking and cancelling time varying channel distortions more rapidly than methods using periodically transmitted training signals. In order for decision directed equalization to provide reliable convergence and stable coefficient values, approximately 90% of the decisions must be correct. The training signal helps the equalizer achieve this 90% correct decision level.

In some systems, "blind" equalization is used to provide initial convergence of the equalizer coefficient values and to force the eye to open. In the blind mode, filter coefficients are coarsely adjusted in response to an error signal which is calculated by employing a known function, or algorithm. Among the most popular blind equalization algorithms are the Constant Modulus Algorithm (CMA) and the Reduced Constellation Algorithm (RCA). These algorithms are discussed, for example, in Proakis, *Digital Communications*, McGraw-Hill: New York, 1989 and in Godard, Self-Recovering Equalization and Carrier Tracking in Two Dimensional Data Communication Systems," *IEEE Transactions on Communications*, November 1980. Briefly, the CMA relies on the fact that, at the decision instants, the modulus of the detected data symbols should lie on a locus of points defining one of several (constellation) circles of different diameters. The RCA relies on forming "super constellations" within the main transmitted constellation. The data signal is first forced to fit into a super constellation, then the super constellation is subdivided to include the entire constellation.

SUMMARY OF THE INVENTION

In accordance with the principles of the present invention, faster equalization is achieved by recycling received training data through an equalizer. In the case of a high definition television receiver for processing a VSB modulated signal, training data is recycled several times within a data field interval between field sync intervals.

DETAILED DESCRIPTION OF THE DRAWINGS

Figure 1:
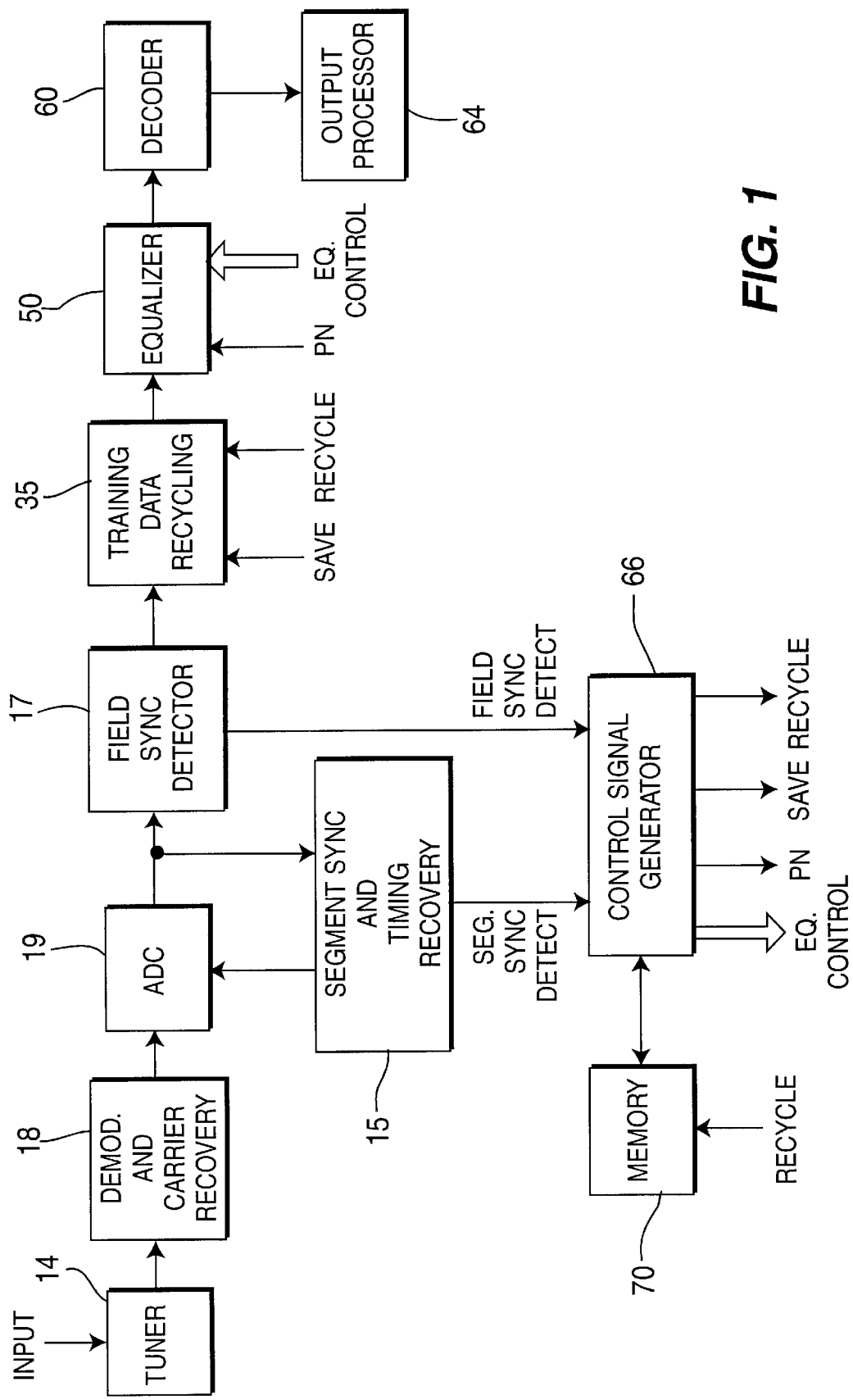
FIG. 1 is a block diagram of a portion of an advanced television receiver, such as a high definition television (HDTV) receiver, including an adaptive equalizer system operative in a training mode according to the principles of the present invention.

In the television receiver of FIG. 1, a modulated analog HDTV Input signal is processed by an input network 14 including RF tuning circuits, a double conversion tuner for producing an intermediate frequency passband output signal, and appropriate gain control circuits, for example. The received signal is an 8-VSB modulated signal as proposed for use by the Grand Alliance HDTV system in the United States. Such a VSB signal is represented by a one-dimensional data symbol constellation wherein only one axis contains quantized data to be recovered by the receiver. To simplify the Figure, not shown are signals for clocking the illustrated functional blocks.

Figure 2:
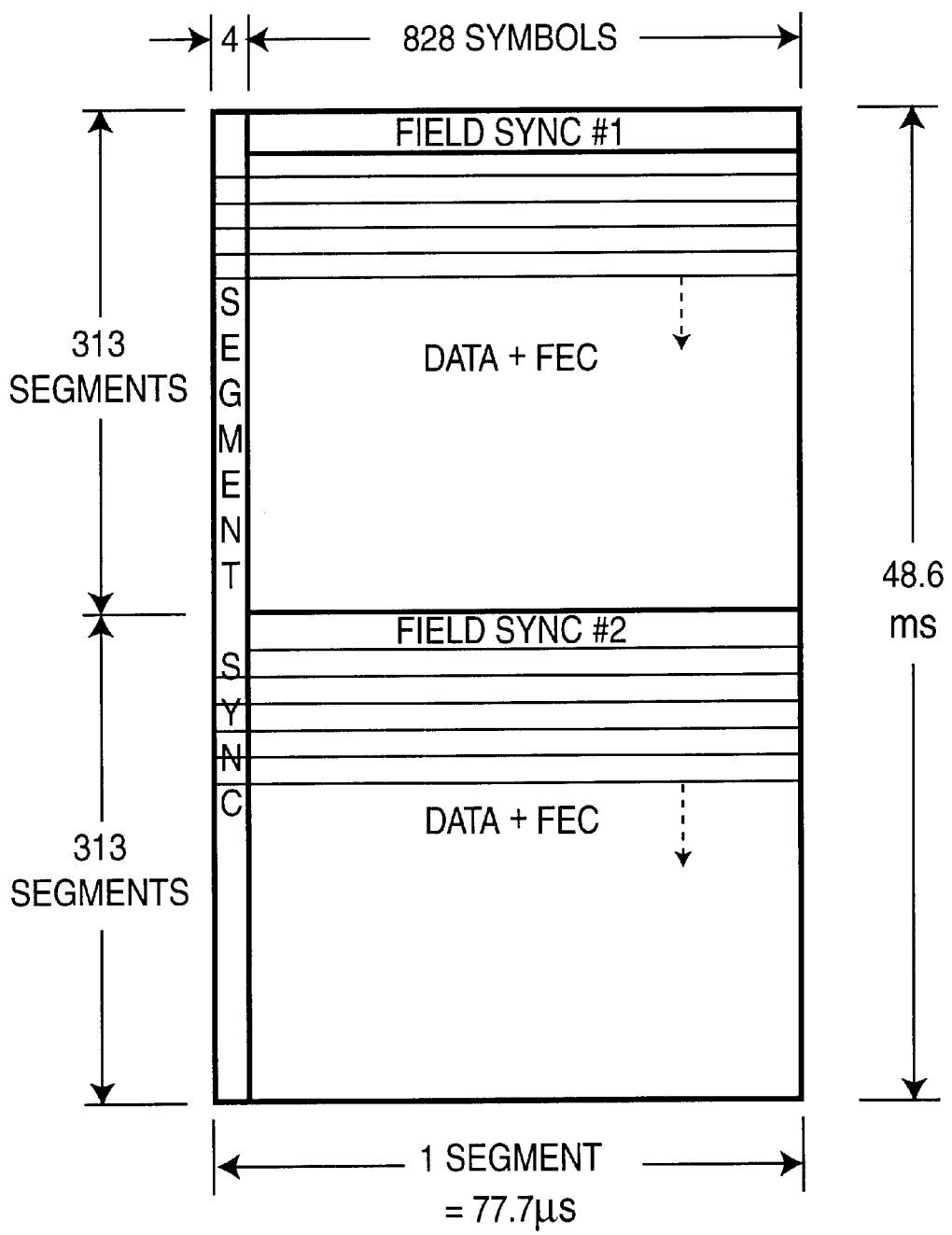
FIG. 2 depicts a data frame format for a VSB signal according to the Grand Alliance HDTV system.
Figure 3:
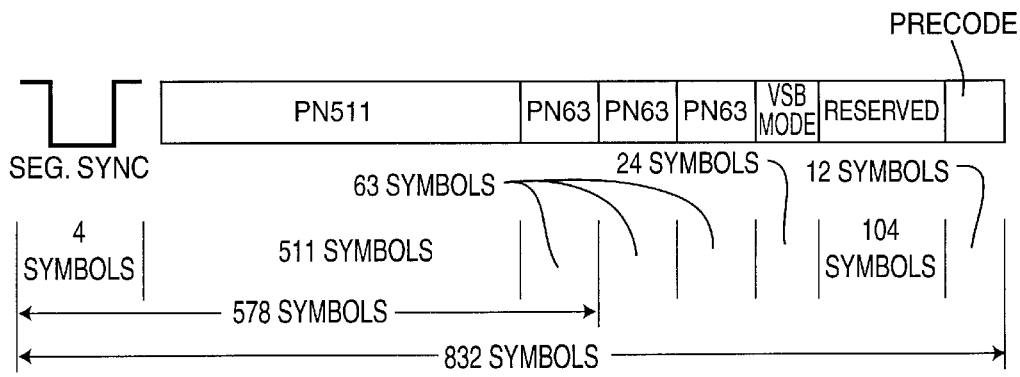
FIG. 3 shows the format of a field sync component of a data field.

As described in the Grand Alliance HDTV System Specification dated Apr. 14, 1994, the VSB transmission system transmits data with a prescribed data frame format as shown in FIG. 2. A small pilot signal at the suppressed carrier frequency is added to the transmitted signal to help achieve carrier lock at a VSB receiver. Referring to FIG. 2, each data frame comprises two fields with each field including 313 segments of 832 multilevel symbols. The first segment of each field is referred to as a field segment, and the remaining 312 segments are data segments. The data segments contain MPEG compatible data packets. Each data segment comprises a four symbol segment sync character followed by 828 data symbols. As shown in FIG. 3, each field segment comprises a four symbol segment sync followed by a field sync component comprising a predetermined 511 symbol pseudorandom number (PN) sequence and three predetermined 63 symbol PN sequences, the middle one of which is inverted in successive fields. A VSB mode control signal (defining the VSB symbol constellation size) follows the last 63 PN sequence, which is in turn followed by reserved symbols and 12 precode symbols copied from the previous field.

The passband output signal from unit 14 in FIG. 1 is converted to a baseband signal by VSB demodulator and carrier recovery network 18. In this example network 18 contains circuits arranged as described in the Grand Alliance HDTV System Specification, and in an article by W. Bretl et al., "VSB Modem Subsystem Design for Grand Alliance Digital Television Receivers," IEEE Transactions on Consumer Electronics, August 1995. Briefly, carrier recovery may be performed by a frequency and phase locked loop using the small pilot signal component included in the broadcast VSB signal. The output baseband signal from network 18 contains only recovered I-channel data symbols along a real axis. The demodulated symbol information from network 18 is converted to a digital datastream by an analog to digital converter 19.

Data segment sync recovery and symbol clock (timing) recovery are performed by unit 15, which may include networks as described in the Grand Alliance HDTV System Specification and in the Bretl et al. article mentioned previously. A Segment Sync Detect output signal is produced when segment sync and timing recovery have been achieved. Recovered segment syncs are used to regenerate a properly phased symbol clock which is used to control the datastream symbol sampling by analog to digital converter 19.

The output of analog to digital converter 19 is applied to a field sync detector 17. Networks suitable for providing field sync detection also are discussed in the Grand Alliance HDTV specification and in the Bretl et al. article. Detector 17 provides a Field Sync Detect output signal to microprocessor 66 when the field sync component has been detected.

The digital data from unit 19 is processed by a training data recycling network 35 according to the present invention, as will be discussed in connection with FIGS. 4 and 5. An output signal from network 35 is applied to adaptive equalizer network 50 as will be discussed in detail in connection with FIG. 6. An equalized baseband output signal from network 50 is decoded by unit 60 and processed by output network 64. Decoder 60 includes, for example, trellis decoding, data de-interleaver, Reed-Solomon error correction and audio/video decoder networks as known and described, for example, in the Bretl article mentioned above. Output processor 64 includes audio/video processors and audio/video reproduction devices.

The segment sync and field sync detection circuits in units 15 and 17 provide output Segment Sync Detect and Field Sync Detect signals to control signal generator 66 (eg., including a microprocessor) when these sync components of the received signal are detected. Microprocessor 66 responds to these signals for providing output equalizer Control signals and an output reference PN (pseudorandom number sequence) training signal to equalizer 50 as will be discussed. The PN training signal sequence is a fixed repetitive pattern of binary data as specified by the Grand Alliance HDTV specification, and is a preprogrammed reference signal acquired by control signal generator 66 from memory 70. Since the data pattern of the stored PN signal is known, an accurate error is generated by obtaining the difference between the stored reference PN signal and the PN training signal component of the received datastream during the field sync interval. The equalizer Control signals control the switching of Multiplexers 26, 28 and 29 in the blind, training and decision-directed operating modes as will be discussed.

Training signal recycling block 35 facilitates faster equalization by recycling the training signal data through equalizer 50. In this regard it has been determined that transmission channel conditions typically exhibit little or no change between two consecutive fields of a VSB data frame. Thus, in accordance with the principles of the present invention, once the field sync is detected and the transmitted PN training signal is available from the received datastream, the received training data is saved and is reused several times to update the equalizer coefficients. In many cases this reuse allows the training signal to open the "eye" characteristic of the symbol datastream during the first field following the first detected field sync. Complete equalization is achieved during the subsequent decision-directed mode.

Figure 4:
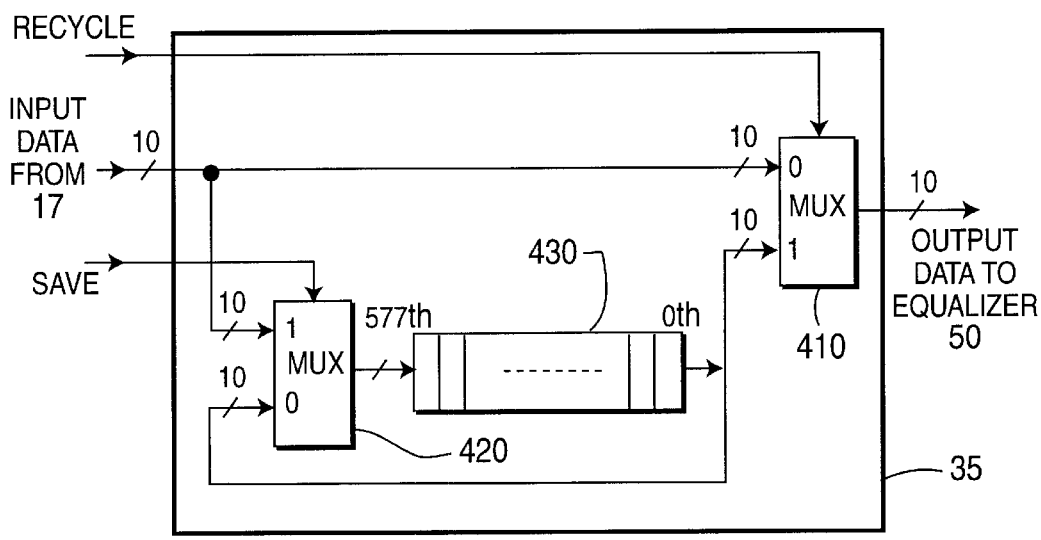
FIG. 4 shows details of a training signal recycling network in FIG. 1.

Details of training signal recycling network 35 are shown in FIG. 4. The "I" symbol datastream from unit 17 is applied to respective inputs of multiplexers 410 and 420. Output data to be equalized is conveyed from the output of mux 410 to equalizer 50. Output data from mux 420, the training data extracted from the input datastream, is stored by a buffer memory 430. Buffer 430 may be a RAM or a FIFO, and in this example has a 578 symbol training data storage capacity, although the storage capacity may be tailored to suit the requirements of a particular system. The output of memory 430 is applied to a second signal input of mux 410, and is also fed back to a second signal input of mux 420. Switching control of mux 410 is provided by a Recycle signal produced by control signal generator 66 in FIG. 1, and switching control of mux 420 is provided by a Save signal also produced by control signal generator 66. The Recycle and Save signals are illustrated in FIG. 5.

Figure 5:
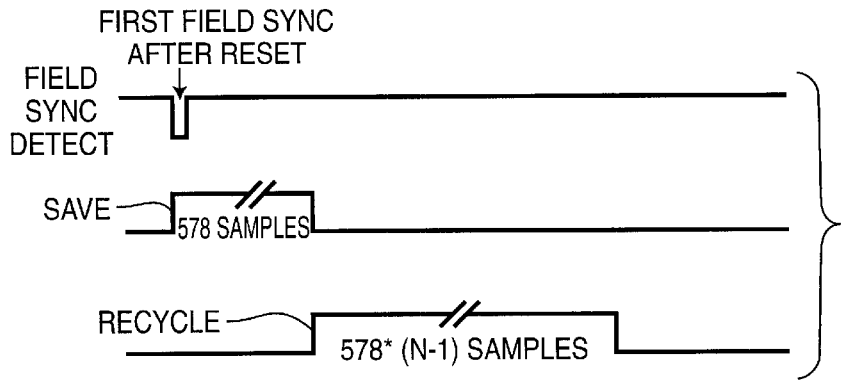
FIG. 5 depicts waveforms helpful in understanding the operation of the network in FIG. 4.

Considering FIG. 4 together with FIG. 5, Field Sync detector 17 (FIG. 1) produces a repetitive Field Sync Detect signal for each detected field sync. When the first field sync is detected, eg., after a reset condition such as after power is re-applied, control signal generator 66 generates a Save signal with a 578 symbol duration. This signal is triggered by the Field Sync Detect signal and is essentially an instruction to write the training signal data which then appears in the input datastream, to memory 430. Specifically, in this example mux 420 passes the first 578 symbol samples that appear in the field sync component of the datastream applied to the signal input of mux 420. These 578 symbols constitute a portion of the training symbol data which is shown in FIG. 3. Thus the four symbol segment sync, a long 511 symbol PN sequence, and a short 63 PN symbol sequence are captured and saved in memory 430. The middle 63 symbol PN sequence is inverted in every other data field sync component. To reduce hardware complexity, only the first of the three 63 symbol sequences is used in this example, although all three 63 symbol segments could be used with the long 511 symbol portion in other systems.

While the training data is being written to memory 430, the training data in the input datastream passes through mux 410 to equalizer 50. At the end of the Save signal, control signal generator 66 generates the Recycle signal, which preferably has a duration of an integer multiple of 578 symbols. The integer multiple (N) is programmed in advance in accordance with the requirements of a particular system so that the 578 training symbols are repeated a predetermined number of times during the data field, before the next field sync component appears. At the same time, the Recycle signal is applied to memory 70 (FIG. 1), which stores a local reference version of the training signal. In this example, memory 70 stores a local version of the signal comprising the first 578 symbols. This local reference training signal is output from memory 70 and compared with the equalized output signal containing the received training data. While the Recycle signal is present, the training data contents of memory 430 are continuously recycled from the output of memory 430 through the lower input of mux 420 in free-running fashion. At the same time, for the duration of the Recycle signal, the training data are repeatedly conveyed from memory 430 and the lower input of output mux 410 to equalizer 50, where equalizer 50 repeatedly compares the training data received from mux 410 as contained in the equalized output signal with local reference training data from memory 70.

At the end of the Recycle signal, the equalizer enters the decision-directed mode during data segment intervals if sufficient equalization has been achieved, as indicated by a predetermined acceptable value of a locally generated equalization error (convergence) signal. Otherwise, the training mode continues whereby the training data recycling process described above is repeated for a subsequent field.

Figure 6:
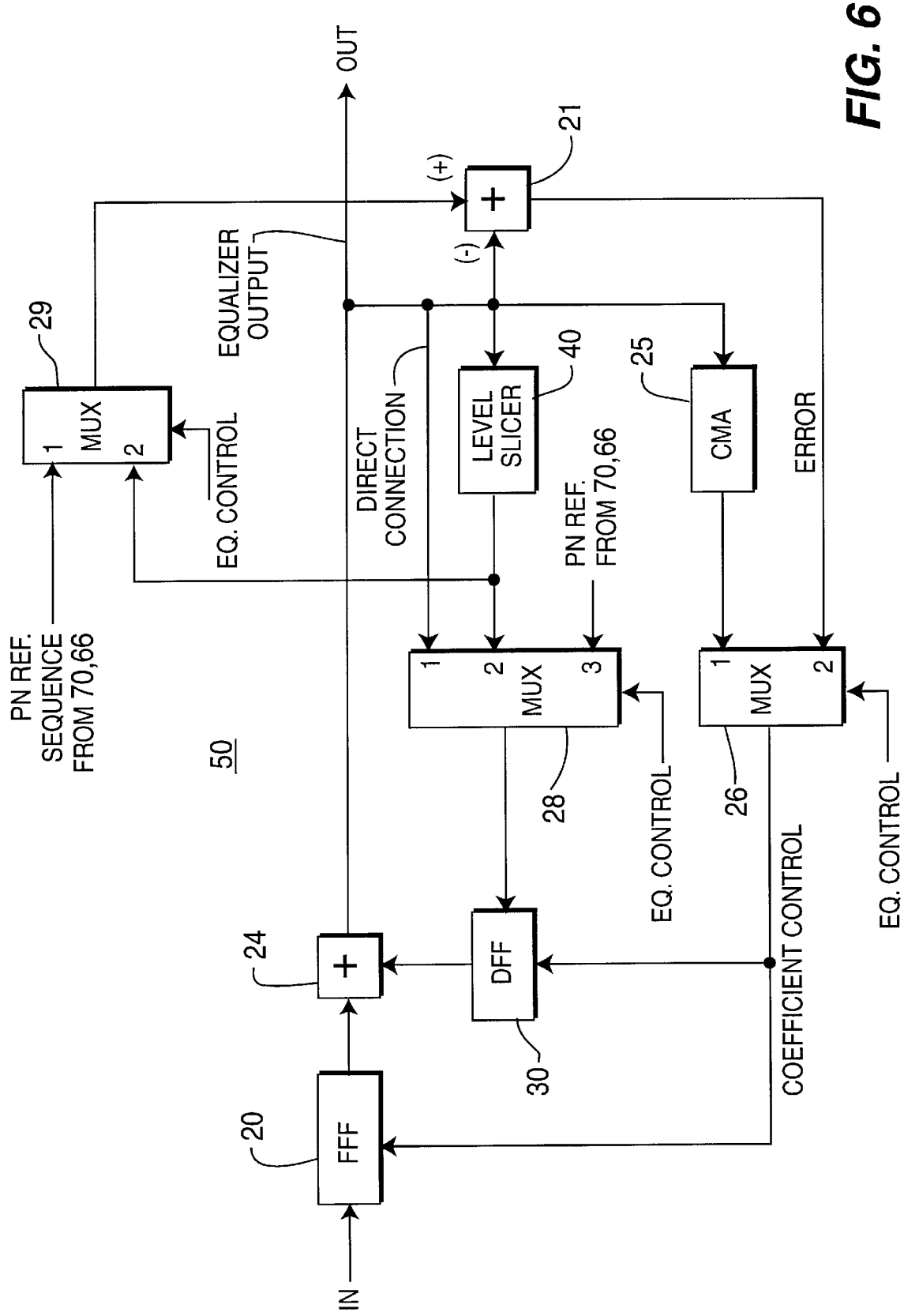
FIG. 6 shows details of an adaptive channel equalizer in FIG. 1.

In the equalizer network shown in FIG. 6, the demodulated digital input signal contains digital data as well as inter-symbol interference (ISI) caused by transmission channel disturbances and artifacts. This input signal is applied to a real (in contrast to a complex) feed-forward filter (FFF) 20 operating as an equalizer, eg., a symbol rate spaced ("T-spaced") equalizer, which in this case is implemented as a digital FIR filter. The coefficient values (tap weights) of equalizer filter 20 are adaptively controlled by a Coefficient Control signal from multiplexer 26 as will be discussed.

The equalized signal from filter 20 is combined by an adder 24 with an equalized signal from a decision feedback filter 30 operating as an equalizer. DFF 30 removes intersymbol interference not removed by FFF 20. The coefficient values (tap weights) of equalizer filter 30 also are adaptively controlled by the Coefficient Control signal (i.e., the switched Error signal) from multiplexer 26. The input signal to be equalized by DFF 30 is provided from multiplexer 28. Both FFF 20 and DFF 30 have coefficient values adapted (updated) in response to the Coefficient Control signal during blind and decision directed operation modes. Both FFF 20 and DFF 30 are digital FIR filters which individually perform equalizing functions. When considered together, these filters represent an aggregate equalizer 50 for equalizing the input signal to decoder 60. FFF 20 equalizes pre-ghost components, while DFF 30 equalizes post-ghost components. FFF 20 and DFF 30 operate in a linear infinite impulse response (IIR) mode from the time the input signal is initially received. Both FFF 20 and DFF 30 are FIR devices, but feedback operation causes DFF 30 to operate as an IIR device.

The output signal from adder 24 is the output signal of equalizer 50. The output of adder 24 is coupled to a network including multiplexers 26 and 28, a slicer 40, a subtractive combiner 21 and a source 25 which provides a CMA blind adaption algorithm.

In the following description of the operation of equalizer 50, the process of initially recycling the training signal data is temporarily neglected to simplify the description.

Mux 26 provides either of two signals to coefficient control inputs of FFF 20 and DFF 30 in response to a Control signal produced by microprocessor 66 for various operating modes when field sync and segment sync components are detected, as will be explained. These signals from Mux 26 include the CMA blind adaption algorithm from unit 25 which responds to the Equalizer Output signal, and an Error signal from the output of subtractive combiner 21. The Error signal represents the difference between the input signal of slicer 40 and the output of a third multiplexer 29. The output of combiner 21 is either a slice Error signal or a training Error signal, where slice Error=output of slicer 40−equalizer output training Error=PN reference signal−equalizer output When generating the training Error signal, the equalizer output is the PN training signal component of the received datastream.

Mux 28 provides either of three input signals to a signal input of DFF 30 in response to an equalizer Control signal from microprocessor 66. These signals include the equalizer 50 output signal as applied via a direct connection to a first input (1) of Mux 28, the output signal from slicer 40 applied to a second input (2) of Mux 28, and the stored PN reference signal from memory 70 and unit 66 applied to a third input (3) of Mux 28.

The inputs of multiplexer 29 are selected in response to an equalizer Control signal from microprocessor 66. Mux 29 receives as inputs the reference PN training signal sequence during field sync intervals, and the output signal from slicer 40 at other times. The output of Mux 29 is applied to subtractive combiner 21 where it is differenced with the output signal from equalizer 50 to produce the Error signal. The Error signal represents either the difference between the slicer 40 and the equalizer 50 output signals, or the difference between the reference PN signal and the PN signal component of the received datastream as contained in the equalizer 50 output signal.

In operation, equalizer 50 exhibits an initial condition, a blind operating mode, a data-directed training mode, a decision-directed mode, and a steady-state equalized condition. The blind mode occurs when the characteristic eight level "eye" pattern of the received 8-VSB signal exhibits a non-converged closed eye pattern. Training and decision-directed operation occur afterwards, when an open "eye" pattern appears. It is noted that it is not necessary for the "eye" pattern to open if the received training signal component is detected immediately. In such case the training signal component is used as soon as it is detected, even before the "eye" pattern opens.

In the initial condition, before timing lock (timing recovery) is achieved, FFF 20 and DFF 30 idle while demodulator 18 attempts to lock the received signal with respect to automatic gain control (AGC), timing and carrier. At this time equalizer Control signals applied to Mux 26 and 28 cause the coefficient values of all taps of FFF 20 and DFF 30 to be reset and held at a zero value, except for one tap value which is reset to a predetermined non-zero initial value. This action of the equalizer Control signals freezes the filter coefficient values to prevent unwanted random changes in coefficient values before the actual useful equalization process begins. Alternatively, FFF 20 and DFF 30 can be pre-loaded with the last-known valid coefficient values. In this initial state both Mux 26 and 28 exhibit a zero output. The output of Mux 29 is a "don't care" condition at this time.

The process of blind equalization using the CMA algorithm begins next, after coarse timing is achieved. The blind mode is performed between field sync segments. This occurs when the segment sync component of the received signal is detected. Carrier lock and AGC lock are present. At such time the Segment Sync Detect signal is conveyed to microprocessor 66, which in turn generates appropriate equalizer Control signals. The process of blind equalization involves the use of the CMA algorithm before the field sync component of the received signal is detected. Specifically, an equalizer Control signal applied to Mux 26 causes Mux 26 to convey the CMA algorithm from its input (1) to the coefficient control inputs of FFF 20 and DFF 30, and a Control signal applied to Mux 28 causes Mux 28 to convey the equalizer output signal from its input (1) to the signal input of DFF 30. The output of Mux 29 is a "don't care" condition during the blind equalizing interval.

The processes of training and decision-directed equalization occur next, when timing lock is achieved after the field sync component is detected. The data-directed training mode occurs when the received PN signal component is available during the field sync interval of each data frame. The presence of the field sync component initiates the start of the PN sequence training mode. As discussed in connection with FIGS. 4 and 5, at such time the Field Sync Detect signal is conveyed to microprocessor 66, which in turn generates appropriate equalizer Control signals. During field sync intervals when the received PN training component is available and the reference PN signal is acquired from memory 70 after the field sync is detected, the Control signals respectively applied to Mux 26, 28 and 29 cause (a) a training Error signal to be coupled to the coefficient control inputs of FFF 20 and DFF 30 via Mux 26, (b) the reference PN signal to be conveyed to the signal input of DFF 30 via Mux 28, and (c) the reference PN signal to be coupled to combiner 21 via Mux 29.

During non-field sync intervals of each data frame when slicer-based decision-directed equalization is being performed, the Control signals respectively applied to Mux 26, 28 and 29 cause (a) a slice Error signal to be coupled to the coefficient control inputs of FFF 20 and DFF 30 via Mux 26, (b) the output of slicer 40 to be conveyed to the signal input of DFF 30 via Mux 28, and (c) the output of slicer 40 to be coupled to combiner 21 via Mux 29. During steady state operation after equalization has been achieved, the signal conditions described above for decision-directed operation prevail.

| Operating Mode | Mux 26 to FFF, DFF Coefficient Control | Mux 28 to DFF Signal input | Mux 29 output |
|---|---|---|---|
| Initial state | 0 | 0 | — |
| Blind Eq. | CMA | Equal. Output | — |
| Training (field sync interval) | training Error | ref. PN signal | ref. PN |
| Decision Dir. (non-field sync int.) | slice Error | slicer out. | slicer out. |

The equalizer control signal associated with the training mode is extended in duration during the recycling process is response to the training signal Recycle signal. Recycling the training signal data in accordance with the principles of the invention occurs during the initial phase of adaptive equalization. The initial phase of adaptive equalization could use blind equalization, recycling the training signal, or a predetermined combination of these processes as a function of software programming in view of anticipated signal conditions. Training signal recycling optionally can be performed or not when the first field sync segment is detected. In the data segment intervals following the field sync interval following the first field sync segment interval, blind equalization may be repeated if the data "eye" pattern is not open. Training signal recycling optionally can be performed or not when the second field sync is detected, and so on to the decision directed mode.

Recycling, or repeating, the training signal data may occur over a predetermined integer number of cycles, eg., 3–4 or 10–15 cycles, based on the requirements of a given system and anticipated signal conditions. The equalizing system is microprocessor controlled to switch between two recycling sequences as a function of certain information. For example, in the case of a 16-VSB modulated signal only 2 or 3 repetitions of the training data within a data field may be needed to converge the equalizer. On the other hand, a less robust 8-VSB modulated terrestrial broadcast signal may require 10 or 15 repetitions of the training data to achieve convergence. A excessively large number of training data repetitions is time consuming and therefore undesirable.

Decision-directed equalizer operation is inactive while the training data is being recycled during data segments prior to convergence. This is accomplished by generator 66 providing appropriate Equalizer Control signals to multiplexers 26 and 28 in response to the Recycle signal (FIG. 5). At the end of each Recycle signal, the equalizer is again able to operate in a decision-directed mode or blind mode as needed, as discussed below.

After a predetermined number of training data repetitions is completed within a given field (eg., within the first field after the field sync is acquired), the equalizer performance is examined to determine if the equalizer has achieved convergence. This can be accomplished by disabling the Recycle control signal during the next field, eg., the second field, and entering the decision-directed mode. If decision-directed operation produces a large slice error signal, indicating that convergence has not been achieved, decision-directed operation is disabled during the next (third) field and the predetermined number of training data repetitions is repeated during the next data field in response to the Recycle control signal. This process continues until the slice error signal indicates that convergence has been achieved. When this occurs, the Recycle signal is disabled, the decision-directed mode is enabled during non-field sync (data segment) intervals, and the data-directed training mode is enabled during field sync intervals, as indicated in the preceding table.

Recycling the training data over several fields may be necessary to achieve convergence. Alternatively, if convergence is not achieved after one or two fields of recycling for example, the blind equalization mode may be used in some predetermined cooperative combination with the process of recycling the training data.

Although the invention has been described in the context of a television receiver, the invention may also be used in other telecommunications devices where a training signal or equivalent are used, such as in modems or COFDM networks, for example.

What is claimed is:

1. A system for processing a datastream received from a transmission channel, said datastream containing recurring training data components, said system comprising:

a demodulator responsive to said datastream for producing a demodulated signal;

an adaptive channel equalizer responsive to said demodulated signal and having plural operating modes including a training mode responsive to said training data components; wherein a received training data component is used more than once by said equalizer during a predetermined interval of said training mode.

2. A system for processing a datastream, received from a transmission channel, said datastream containing a received Vestigial Sideband (VSB) modulated signal comprising recurring training data components and high definition video data represented by a VSB symbol constellation, said data having a data frame form constituted by a succession of data frames comprising:

a demodulator responsive to said datastream for producing a demodulated signal;

an adaptive channel equalizer responsive to said demodulated signal, and having plural operating modes including a training mode responsive to said training data components, wherein a received training data component is used more than once by said equalizer during a predetermined interval of said training mode.

3. A system according to claim 2, wherein said received training data component is reused during a first data field following a first detected field sync component.

4. A system according to claim 3, wherein said reused training data component is contained in said first detected field sync component.

5. A system according to claim 3, wherein said reused training data component is constituted by less than said received training data component.

6. A system according to claim 3, wherein said training data component is constituted by a plurality of pseudorandom number (PN) sequences; and said reused training data is constituted by less than all of said plurality of PN sequences.

7. A system according to claim 6, wherein said plurality of PN sequences includes an inverting PN sequence that inverts from one data field to the next; and said reused training data component is constituted by less than all of said plurality of PN sequences excluding said inverting PN sequence.

8. A system according to claim 7, wherein said reused training data component is constituted by the first two of said plurality of PN sequences.

9. A system according to claim 6, wherein said reused training data component comprises a first of said plurality of PN sequences and three subsequent, relatively shorter PN sequences; and said reused training data component is constituted by the first two of said plurality of PN sequences.

10. A system according to claim 2, wherein said predetermined interval encompasses a field sync interval and more than one data segment interval of a data field.

* * * * *